United States Patent
Linsenmaier et al.

(10) Patent No.: US 12,141,352 B2
(45) Date of Patent: Nov. 12, 2024

(54) METHOD FOR IMPLEMENTING A ZOOMING FUNCTION IN AN EYE TRACKING SYSTEM

(71) Applicant: Viewpointsystem GmbH, Vienna (AT)

(72) Inventors: Frank Linsenmaier, Weinstadt (DE); Martin Koza, Vienna (AT)

(73) Assignee: Viewpointsystem GmbH, Vienna (AT)

( * ) Notice: Subject to any disclaimer, the term of this patent is extended or adjusted under 35 U.S.C. 154(b) by 27 days.

(21) Appl. No.: 18/265,252

(22) PCT Filed: Dec. 7, 2020

(86) PCT No.: PCT/EP2020/084920
§ 371 (c)(1),
(2) Date: Jun. 4, 2023

(87) PCT Pub. No.: WO2022/122117
PCT Pub. Date: Jun. 16, 2022

(65) Prior Publication Data
US 2024/0036643 A1    Feb. 1, 2024

(51) Int. Cl.
*G06F 3/01*    (2006.01)
*G06F 3/0484*    (2022.01)

(52) U.S. Cl.
CPC ............ *G06F 3/013* (2013.01); *G06F 3/0484* (2013.01)

(58) Field of Classification Search
CPC ................................ G06F 3/013; G06F 3/0484
See application file for complete search history.

(56) References Cited

U.S. PATENT DOCUMENTS

| | | | |
|---|---|---|---|
| 8,379,918 B2 | 2/2013 | Pflege | |
| 9,197,864 B1 | 11/2015 | Starner | |
| 2006/0104545 A1* | 5/2006 | Matsumoto | G06T 15/08 382/302 |
| 2011/0043644 A1* | 2/2011 | Munger | H04N 13/122 348/207.1 |
| 2012/0146891 A1 | 6/2012 | Kalinli | |
| 2015/0325008 A1* | 11/2015 | Scarff | G06T 11/60 345/605 |
| 2016/0206196 A1 | 7/2016 | Pflege | |
| 2016/0317245 A1 | 11/2016 | Bismuth | |
| 2019/0331914 A1* | 10/2019 | Lee | G06F 3/013 |

FOREIGN PATENT DOCUMENTS

| | | |
|---|---|---|
| EP | 1422923 A2 | 5/2004 |
| WO | 2019185716 A1 | 10/2019 |

OTHER PUBLICATIONS

International Search Report and Written Opinion from corresponding International Application No. PCT/EP2020/084920, mailed on Aug. 27, 2021, 13 pages.

(Continued)

*Primary Examiner* — David Tung
(74) *Attorney, Agent, or Firm* — Liang & Hennessey LLP; Brian Hennessey

(57) ABSTRACT

The present invention concerns a method for providing an eye tracking devices and systems with a zooming function on specific Region of Interest, said Region of Interest being part of the field of view of a user wearing an eye tracking device, said zooming function triggered by a specific event correlated to detected user's gaze information.

15 Claims, 6 Drawing Sheets

(56) References Cited

OTHER PUBLICATIONS

Chenhui Li et al., "Interactive visualization of high density streaming points with heat-map," Smartcomp 2014, Nov. 3, 2014, 5 pages.

Nicholas Adams et al., "The inspection of very large images by eye-gaze control," AVI '08 Proceedings of the Working Conference on Advanced Visual Interfaces, May 28, 2008, 8 pages.

Elizabeth A. Krupinski et al., "Eye-movement study and human performance using telepathology virtual slides. Implications for medical education and differences with experience," Human Pathology (2006) 37, 1543-1556, Nov. 25, 2006.

* cited by examiner

METHOD FOR IMPLEMENTING A ZOOMING FUNCTION IN AN EYE TRACKING SYSTEM

TECHNICAL BACKGROUND

The present invention discloses a method for providing eye tracking devices and systems with a zooming function triggered by a specific event on specific region of Interest of the field of view of a user wearing an eye tracking device.

Eye-tracking devices and in particular spectacles usually comprise a camera, which is oriented onto an eye of the spectacles wearer; the coordinates of the pupil and the viewing direction of the eye can be ascertained using such spectacles and displayed on a correspondent display computer device where a second user is able to watch the gaze direction of the wearer on his relevant field of view, via internet live streaming. Therefore together with a so-called field of vision video, which is prepared by a further field of vision camera arranged on the spectacles in the viewing direction of a user, the point at which the user looks can be ascertained using such spectacles.

These known eye tracking spectacles are part of an eye tracking system which may further comprise a computer device able to receive eye tracking data, such as eye video for pupil detection and field of vision video. Said eye tracking system is able to give, as an output, a field of view video, comprising information regarding the user's gaze direction. Said output then is sent to a user operating a display computer device via internet streaming. In both the abovementioned configurations the second user is able to see, via internet streaming in real time, what the user wearing the eye tracking device is looking at in his specific field of view, through a computer device remotely connected to the eye tracking device.

PRIOR ART

US2016/0206196 discloses eye-tracking spectacles being part of an eye tracking system comprising a computer device, where runs a software able to implement functionality already mentioned.

This prior art document describes eye-tracking spectacles comprising two eye cameras arranged in the nose frame of the glasses and a field of view camera in the middle of the glasses.

In particular according to one preferred embodiment of the prior art invention, it is provided that at least one field of vision camera is arranged on the glasses frame. The field of vision camera is provided to record a field of vision, video including individual and successive field of vision images. The recordings of the two eye acquisition cameras and the at least one field of vision camera can thus be entered in correlation in the field of vision video of the respective gaze point.

Unfortunately this prior art document teaches to provide a user remotely connected, with streaming of the full field of view of the wearer, which means sending a big amount of data to the user remotely connected. Most of the times said data are unnecessary for the user remotely connected, because in general this user is more interested only on the part of the field of view where the wearer is really focusing on.

In fact the remotely connected user is more interested on fixation points of the wearer, because for instance he is looking for something in particular, or a specific object between similar objects. A method for detecting fixation points by a user wearing eye tracking spectacles is described in the U.S. Pat. No. 8,379,918.

Unfortunately broadcasting a big amount of data during live streaming between the user wearing the eye tracking glasses and the user remotely connected might create problems during the internet connection, which might not be stable and reliable.

In some cases the user remotely connected need to appreciate details in the image displayed in his computer device which cannot be shown, because of low resolution of the image, thus making the known eye tracking system partially useless.

Purposes of the Invention

One objective of the present invention, according to a first of its aspects, is obtaining an eye tracking device and system, being able to reduce the amount of data live streamed from a user wearing the eye tracking device to a remotely connected user operating a display computer device.

A second objective of the present invention is giving the possibility to the user remotely connected to perceive details in the image displayed on his computer device, without the necessity to receive continuously high resolution images from the eye tracking system/device.

A third objective of the present invention is giving the possibility to the user remotely connected to focus only on, eye tracking device wearer fixations are located.

A further objective of the present invention is to provide an eye tracking system where the user remotely connected, can easily customize the analysis quality of the video streamed by the user wearing the eye tracking device.

Another objective of the present invention is to provide an eye tracking device and system, easy to use by the user remotely connected via live streaming, having an immediate understanding of the most important objects of interest fixated by the wearer.

SUMMARY OF THE INVENTION

Hereinafter are summarized some technical aspects of the present inventions which enable some of the most important purposes to be achieved.

According to a first aspect this invention relates to a method for zooming into a specific Region of Interest visualized in a display computer device, showing gaze inputs on a field of view from a user wearing eye tracking device, said eye tracking device comprising at least one eye camera configured to detect pupil position of the wearer, the eye tracking device thus providing gaze information, said eye tracking device further comprising one field of view camera configured to detect the field of view of said user, said zooming function being triggered by a specific user's eye behaviour, in particular a so called long fixation over an object of interest.

Such method confers the possibility to reduce data streaming between the eye tracking device and the display computer device remotely connected, at the same time improving analysis capabilities of the user operating the display computer device remotely connected. The method confers also the possibility to reduce data streaming between the computer device and the display computer device remotely connected, being the computer device connected to the eye tracking device, at the same time improving analysis capabilities of the user operating the display computer device remotely connected.

According to a second aspect this invention relates to a method wherein the visual representation of the field of view of the user wearing the eye tracking device, is a predetermined low resolution image and is a reduced visual representation concerning only the area scanned with his eye movements by the wearer, these features aiming to further reducing the amount of data streamed to the display computer device remotely connected.

According to a third aspect this invention relates to a method wherein, if a further second long fixation visual point is no more over the object of interest AND if the second long fixation visual point is still comprised in the visualised Region of Interest, the method provides repositioning the Region of Interest in such a way that the second long fixation visual point be the centroid of said repositioned Region of Interest AND causing the display computer device via internet live streaming to display the repositioned Region of Interest.

In this case the user operating the display computer device remotely connected, is able to continuing focusing on a further object of interest fixated by the user wearing the eye tracking device, said object being still in the Region of Interest.

According to a fourth aspect this invention relates to a method wherein if the second long fixation visual point is no more over the object of interest AND if at least one fixation visual point is out of the visualised Region of Interest, the method provides zooming out to the visual representation of the full field of view of the user wearing the eye tracking device, displaying in the display computer device a low resolution image.

In this way the user operating the display computer device remotely connected, is able to continuing scanning the user's gaze movements correlated to his full field of view.

According to a fifth aspect this invention relates to a computer readable storage comprising computer-executable instructions which, when executed, configure a processor to perform the method described.

According to a sixth and a seventh aspects this invention relates to eye tracking device and computer device comprising a processor, a computer readable storage medium coupled to the processor, the computer readable storage medium having stored thereon computer executable instructions which, when executed, configure the processor to perform the corresponding steps of the method described.

According to a eighth aspect this invention relates to an eye tracking system comprising an eye tracking device, a computer device comprising a processor, a computer readable storage medium coupled to the processor, the computer readable storage medium having stored thereon computer executable instructions which, when executed, configure the processor to perform the corresponding steps of the method described.

According to further aspects this invention relates to further method features claimed in the dependent claims of the present specification.

FIGURES

The structural and functional features of the present invention and its advantages with respect to the known prior art, will become even clearer from the underlying claims, and in particular from an examination of the following description, made with reference to the attached figures which show a preferred but not limited schematic embodiment of the invented method, system, device, in which:

DETAILED DESCRIPTION OF THE INVENTION

Figure 1:
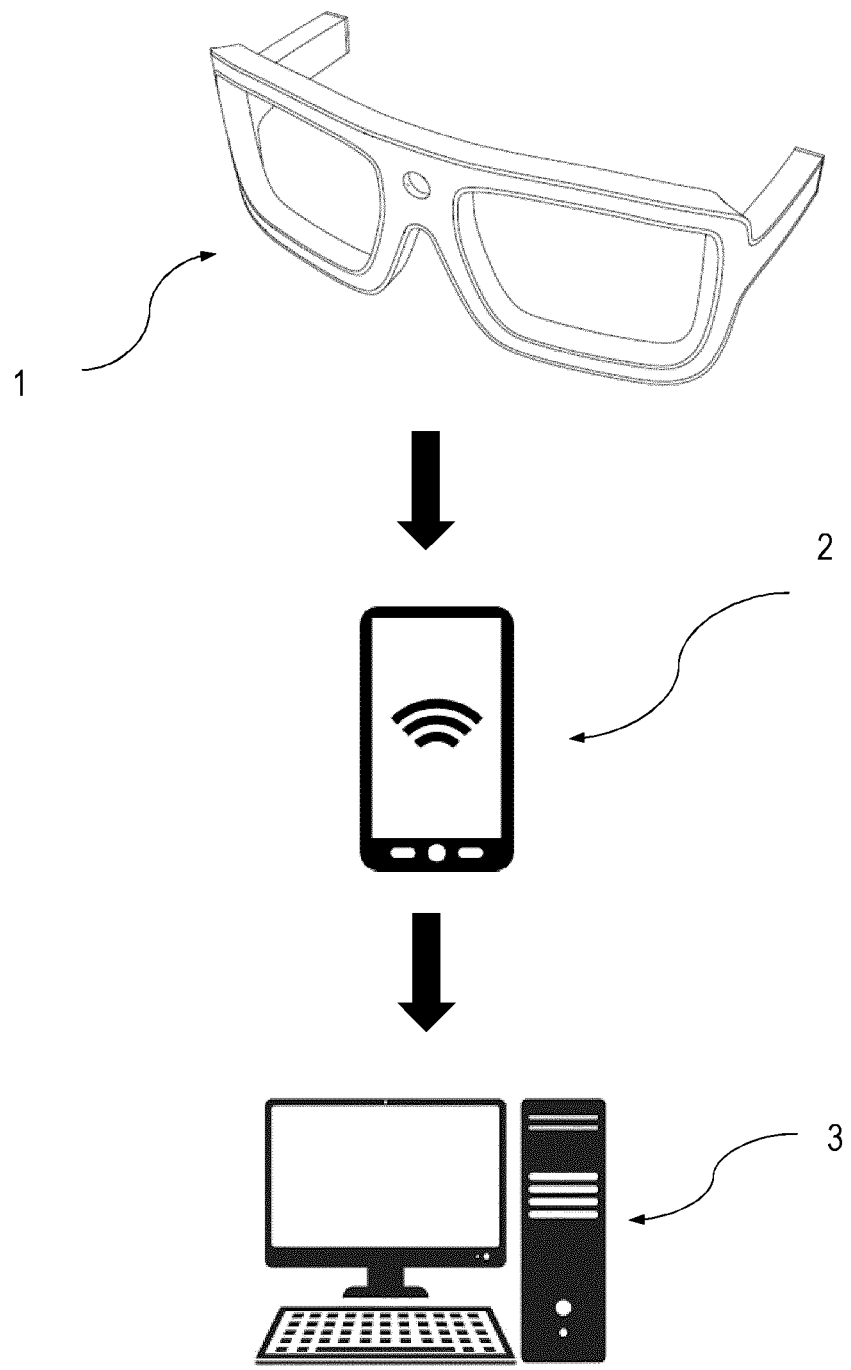
FIG. 1 illustrates one preferred embodiment of the system architecture according to the present invention.

In general, this disclosure describes method for providing eye tracking devices and systems with a zooming function, triggered by a specific event on specific region of Interest of the field of view of a user wearing an eye tracking device.

The eye tracking device 1 may have a frame, wherein the frame has at least one receiving opening/lens receptacle opening for a disk-like structure, and wherein the frame has an U-shaped portion where preferably are located a right eye acquisition camera and a left eye acquisition camera, said cameras having the purpose of detecting the position of the user's eye, in order to determine continuously his gaze direction when in use. The frame may have a U-shaped portion provided for arranging the eye tracking device 1 on the nose of a human.

Due to the integration of the eye acquisition cameras in the nose frame parts, the eye tracking device 1, in a preferred solution, may do not have any protruding parts, and is therefore suitable to be worn as work spectacles or protective spectacles. The viewing movements of a worker or of a human operating a machine can thus not only be monitored and analysed, but rather can be used directly for controlling the machine. In addition, the capability for controlling a machine can thus be monitored, since the physical and mental state of the relevant human can be concluded on the basis of the eye movements, for example, whether he is overtired or under the influence of psychotropic substances. Thus, above all in the case of public use of the eye tracking device 1, significantly improved results can be achieved, because the measurement accuracy is increased, and also the measurement apparatus can now no longer be perceived by the surroundings and therefore also does not result in negative influences of the test person. The specifications "right" or "left" or "high" or "low" relate to the intended manner of wearing the eye tracking device 1 by a human being.

As mentioned before, in a preferred solution, the right eye acquisition camera is arranged in the right nose frame part, and the left eye acquisition camera is arranged in the left nose frame part of the eye tracking device. The two eye acquisition cameras are designed as digital cameras and may have an objective lens. The two eye acquisition cameras are each provided to observe one eye of the human wearing the relevant eye tracking device 1, and to prepare in each case an eye video including individual eye images or individual images.

A primary purpose of the eye acquisition cameras is to acquire the pupil of the human wearing the eye tracking device 1, therefore they must be directed towards the position of the eyeball of the wearer.

According to one preferred embodiment of eye tracking device 1, it is provided that at least one field of vision camera is arranged on the eye tracking device frame, preferably in the U-shaped portion of the frame. The field of vision camera is provided to record a field of vision video, including individual and successive field of vision images. The recordings of the two eye acquisition cameras and the at least one field of vision camera can thus be entered in correlation in the field of vision video of the respective gaze point. A larger number of field of vision cameras can also be arranged in the eye tracking device 1. For instance the eye tracking device may be provided with at least two cameras, where at least one of them has a wider Field of View and low resolution and at least one of them with a narrower Field of View but capable of higher resolution.

It is preferably provided that the eye tracking device 1 have electronic components like a data processing unit and a data interface, the data processing unit may be connected to the right eye acquisition camera and the left eye acquisition camera. The eye tracking device 1 furthermore may have an energy accumulator for the energy supply of the right eye acquisition camera and the left eye acquisition camera, and also the data processing unit and the data interface.

According to one particularly preferred embodiment of present eye tracking device 1 it is provided that the electronical components, including a processor and a connected storage medium, may be arranged in the sideway part of the frame of the eye tracking device. The entire recording, initial analysis, and storage of the recorded videos can thus be performed in or by the eye tracking device 1 itself or by a computer device 2 connected to the eye tracking device 1.

A data processing unit also comprises a data memory. It is preferably designed as a combination of a microcontroller or processor together with a RAM. The data processing unit is connected in a signal-conducting manner to a data interface. It can also be provided that the data interface and the data processing unit are formed jointly in hardware, for example, by an ASIC or an FPGA. The interface is preferably designed as a wireless interface, for example, according to the Bluetooth standard or IEEE 802.x, or as a wired interface, for example, according to the USB standard, wherein in this case the eye tracking device 1 have a corresponding socket, for example, according to micro-USB. Additional sensors could be inserted in the eye tracking device 1 and connected with the data processing unit.

The data processing unit and the data interface may be connected at least indirectly to the energy accumulator by circuitry, and are connected in a signal-conducting manner to the three cameras, the field of vision camera, the right eye acquisition camera, and the left eye acquisition camera.

As already described, the present described method is particularly well suitable for eye tracking systems comprising an eye tracking device and a computer device, said system being able to perform a zooming function into a specific Region of Interest 40 in the visual representation 10 of the field of view of a eye tracking device wearer. Said visual representation 10 is thus displayed, via internet streaming, on a display computer device 3 remotely connected to the eye tracking system, of which the eye tracking device 1 is part.

Figure 2:
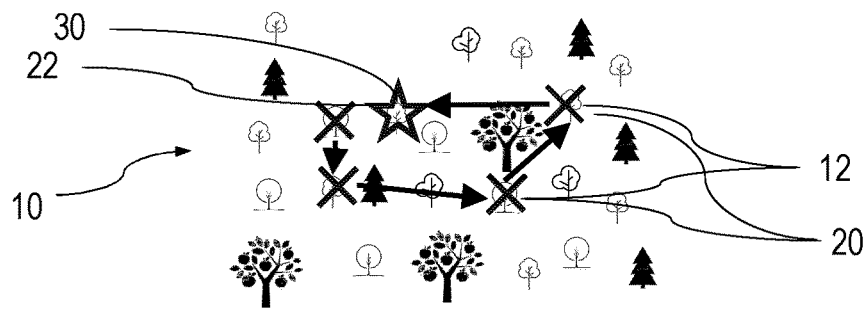
FIGS. 2 to 11 illustrate examples of possible visual representations on a display computer device showing one or more steps of the method according to the present invention.

FIGS. 2 to 11 describe schematically the following steps of the method according to the present invention:

FIG. 2: visual representation 10 of the eye tracking device wearer on the display computer device 3 remotely connected, via a computer device 2, to the eye tracking device 1, said visual representation 10 comprises objects (different kind of trees for instance), visual points 12, long fixation visual points 22, fixation visual points 20, object of interest 30 (marked as a star), the wearer eye movements and behaviour like saccades (marked as arrows), fixations (marked as X). In this step said visual representation 10 is a low resolution image.

Figure 3:
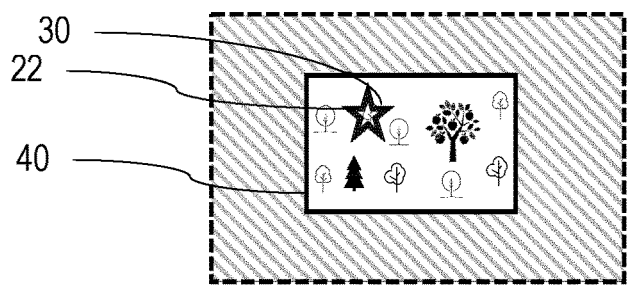

FIG. 3: A possible size reduced field of view of the eye tracking device wearer live streamed on the display computer device 3, for instance with a default image size (¼) compared to the full field of view image size. It is a reduced visual representation 10 concerning only the area of the field of view of the user wearing the eye tracking device 1, where are detected the user's gaze movements, in order to further reduce the streamed data.

Figure 4:
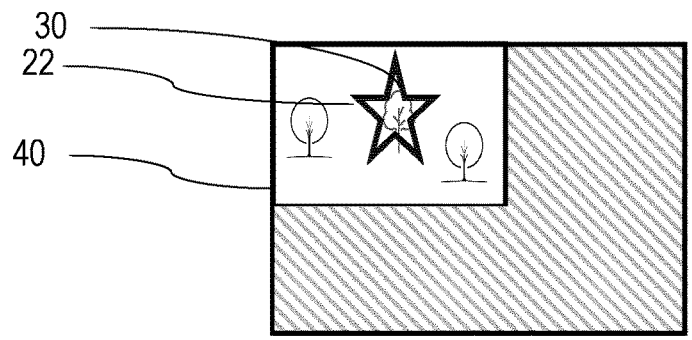
Figure 5:
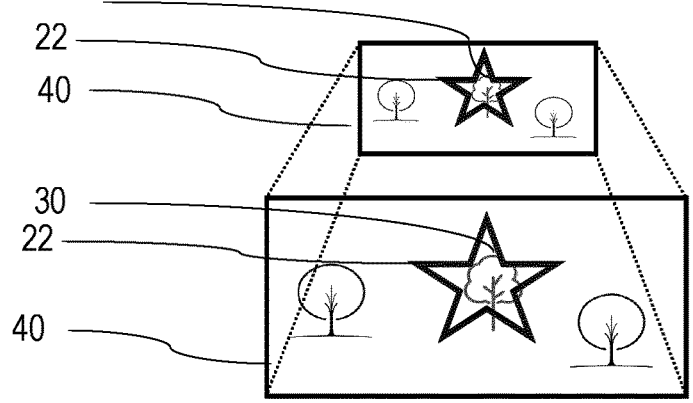

FIGS. 4 and 5: A possible defined Region of Interest 40 streamed on the display computer device 3 and zooming in result, triggered by long fixation criterion, with dimension for instance ¹⁄₁₆ size compared to the full field of view image size; in this step the image may have the highest resolution possible. It shall be highlighted that dimension of the Region of Interest may be selectable by the user operating the display computer device 3 via said display computer device 3. Furthermore the dimension of the Region of Interest may be set up automatically proportionally to the dimension of the detected object of interest 30.

Figure 6:
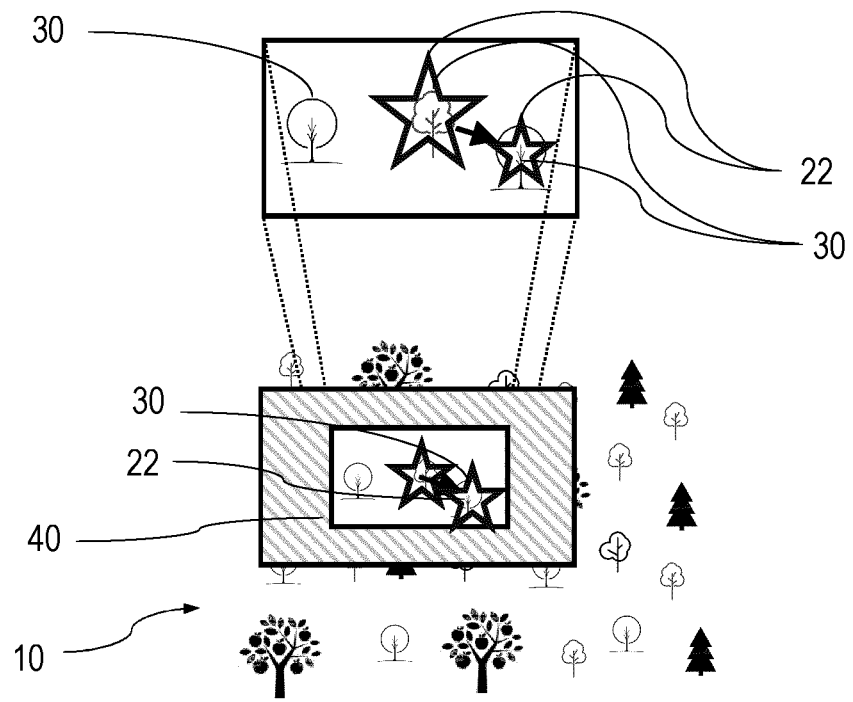
Figure 7:
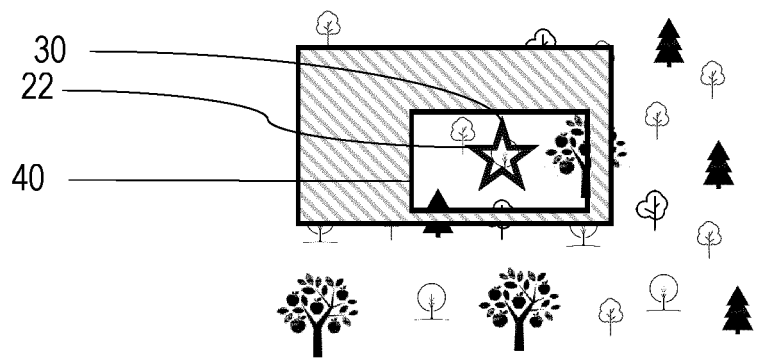

FIGS. 6 and 7: show the case where in the Region of Interest 40, the eye tracking device wearer has a second long fixation event on a second long fixation visual point 22 still in the Region of Interest 40 but in a different position compared to the centroid of the Region of Interest 40; In this case it is shown still a zoomed in image, with the highest resolution possible, as an option.

Figure 8:
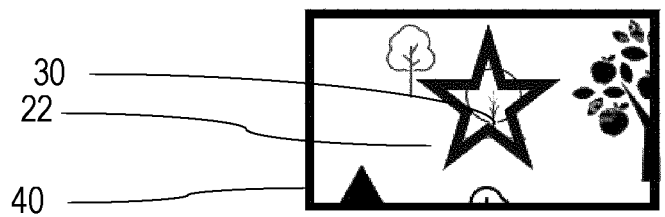
Figure 9:
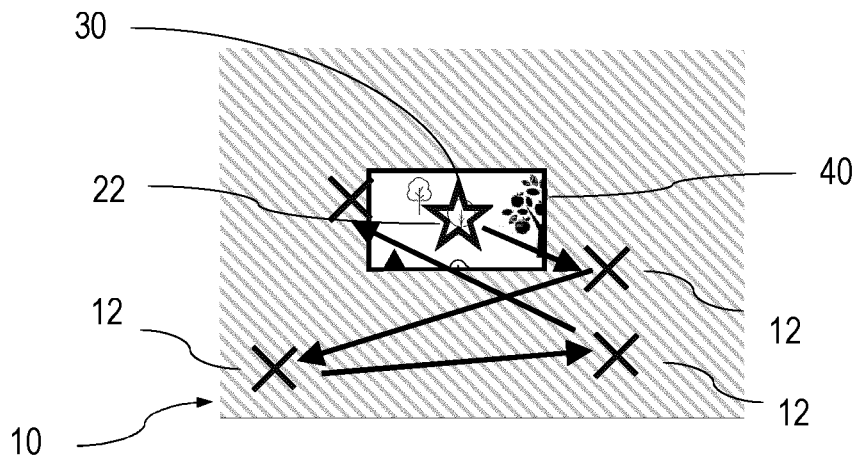
Figure 10:
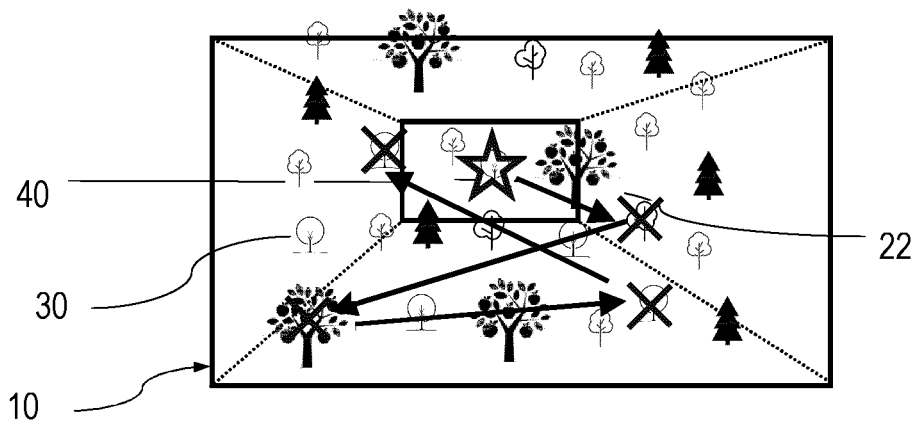

FIG. 8: shows repositioned Region of Interest 40 streamed on the display computer device 3;

FIG. 9: shows the case where the eye tracking device wearer continues to move his/her gaze, scanning the environment in his/her field of view, comprising visual points 12 outside the already defined Region of Interest 40;

FIG. 10: shows the effect of zooming-out function, able to return up to the original full field of view image, said function triggered by detecting at least one fixation visual point out the Region of Interest 40. In this case it may be shown as a low resolution image.

Figure 11:
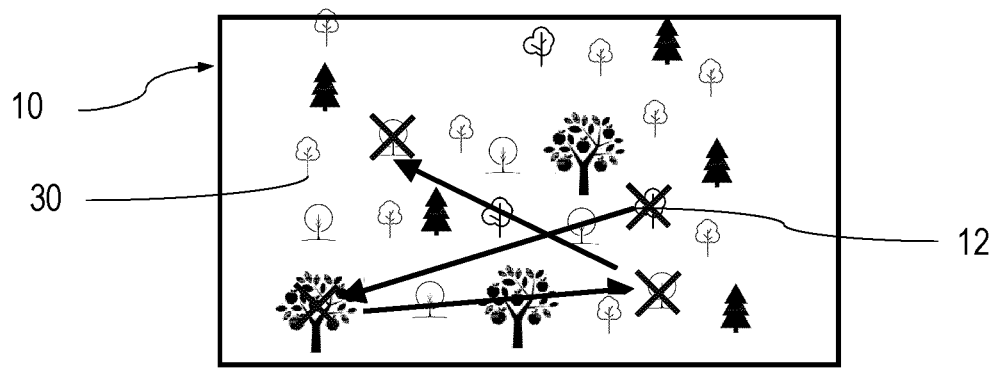
Figure 12:
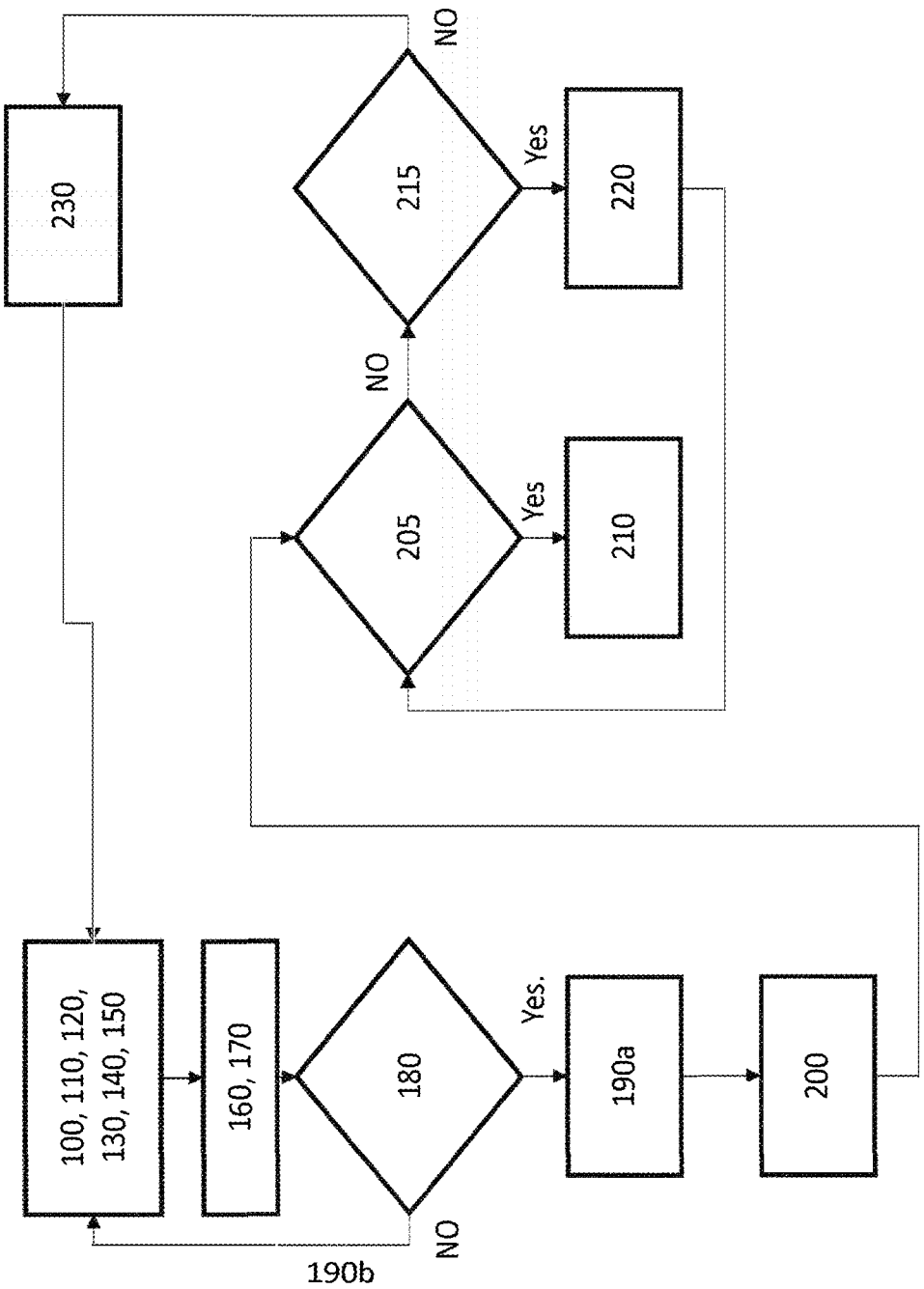
FIG. 12 illustrates a flow chart of some steps of the method according to the present invention.

FIG. 11: shows the full field of view of the eye tracking device wearer streamed on the display computer device 3, after having zooming out from the Region of Interest 40.

It is necessary to point out that the speed of zooming in and zooming out events may be set up automatically and proportionally to the duration of the long fixation event or may be performed according to a predetermined speed.

Deepening more in details, the method object of the present invention is able to show user wearing an eye tracking device 1 gaze inputs on his field of view, wherein the method comprises the following steps:

- 100: receiving more than one visual representation 10 of full field of view of the user wearing the eye tracking device 1;
- 110: receiving gaze information identifying movements of the user's gaze represented by visual points 12 on related visual representations 10;
- 120: having a predetermined fixation criterion, in order to determine fixation visual points 20 of the user on one or more of the visual representations 10,
- 130: receiving gaze information indicating fixation events on corresponding fixation visual points 20 on related visual representations 10;

140: having a predetermined long fixation criterion, in order to determine long fixation visual points 22

150: receiving gaze information indicating at least one first long fixation event on corresponding long fixation visual point 22 on related visual representations 10;

160: causing a display computer device 3 via internet live streaming to display at least fixation visual points 20 and the at least one long fixation visual point 22 on the visual representation 10 of the field of view of the user, in a predetermined low resolution image;

170: detecting possible object information indicating at least one object of interest 30 respect to its background on related visual representations 10;

180: checking if the long fixation visual point 22 matches the at least one object of interest 30 in the field of view of the user wearing the eye tracking device 1, 190a: if the long fixation visual point 22 matches said object of interest 30, upon the long first fixation event occurring, defining a Region of Interest 40 designed in such a way that the long fixation visual point 22 be the centroid of said Region of Interest 190b: if the long fixation visual point 22 does not match said Object of interest 30, upon the long fixation event occurring, starting again the method;

200: causing the display computer device 3 via internet live streaming zooming in said Region of Interest 40 and, in order to display on the display computer device 3 only the Region of Interest 40, thus providing a higher resolution image to the display computer device 3.

Showing a specific zoomed in Region of Interest to a user operating a computer device remotely connected to the eye tracking device 1, is particularly relevant for that user, as he/she is able to perceive, via a better quality image, what the user wearing the eye tracking device is fixating in that precise moment, for instance a specific object among others. In the Region of Interest the user remotely connected can appreciate each detail of the specific object, thanks to the zooming function implemented with a higher resolution image. Furthermore with this technique is achieved a reduction of data to be streamed between the eye tracking eye tracking device and possibly a computer device 2, and the display computer device 3 remotely connected.

Therefore in case the eye tracking system does not comprise a computer device and the eye tracking device comprises all electronical components above mentioned including a processor unit, a medium storage, the method object of the present invention, comprises the following steps:

100: sending more than one visual representations 10 of full field of view of the user wearing the eye tracking device 1;

110: sending gaze information identifying movements of the user's gaze represented by visual points 12 on related visual representations 10;

120: having a predetermined fixation criterion, in order to determine fixation visual points 20 of the user on one or more of the visual representations 10, 130: sending gaze information indicating fixation events on corresponding fixation visual points 20 on related visual representations 10;

140: having a predetermined long fixation criterion, in order to determine long fixation visual points 22

150: sending gaze information indicating at least one first long fixation event on corresponding long fixation visual point 22 on related visual representations 10;

160: causing a display computer device 3 via internet live streaming to display at least fixation visual points 20 and the at least one long fixation visual point 22 on the visual representation 10 of the field of view of the user, in a predetermined low resolution image;

170: detecting possible object information indicating at least one object of interest 30 respect to its background on related visual representations 10;

180: checking if the long fixation visual point 22 matches the at least one object of interest 30 in the field of view of the user wearing the eye tracking device 1, 190a: if the long fixation visual point 22 matches said object of interest 30, upon the long first fixation event occurring, defining a Region of Interest 40 designed in such a way that the long fixation visual point 22 be the centroid of said Region of Interest 190b: if the long fixation visual point 22 does not match said Object of interest 30, upon the long fixation event occurring, starting again the method;

200: causing the display computer device 3 via internet live streaming zooming in said Region of Interest 40 and, in order to display on the display computer device 3 only the Region of Interest 40, thus providing a higher resolution image to the display computer device 3.

Regarding step n. 200 zooming in said specific Region of Interest may be implemented by restricting the readout of the field of view camera of the eye tracking device to only that region of interest, while dynamically changing the readout of the field of view camera to a higher resolution, or by cropping and resizing the Region of Interest from a larger "full" image of the full field of view of the wearer, via image processing software methods, or in case the eye tracking device has two different field of view cameras, by switching the internet live streaming into a second "detail" camera capable of higher resolution, starting from a first "full" field of view camera characterized by predetermined low resolution, to reduce streaming data amount.

Furthermore zooming in said specific Region of Interest may be implemented by a mechanically driven zooming optics triggered by the fixation of the user wearing the eye tracking device, said optics being a zoom lens like a photo camera lens with optic zoom.

The method in the present invention uses important well known fixation concept. One definition of this concept is easily understandable according to FIGS. 13 and 14 and the following paragraphs.

Figure 13:
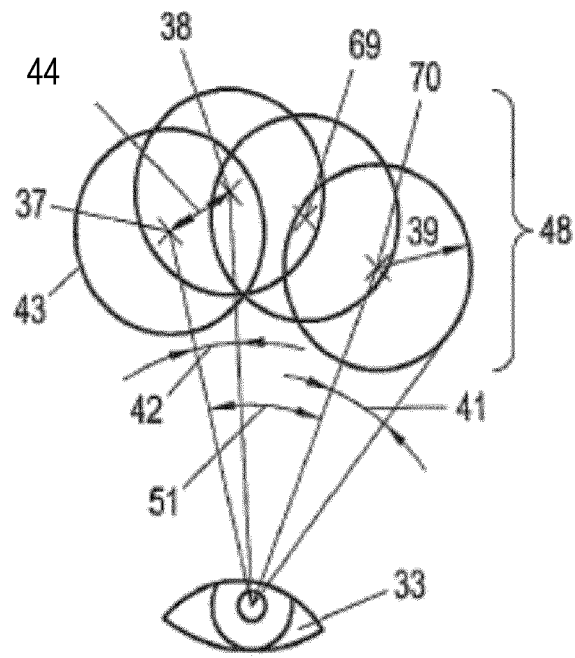
FIG. 13 illustrates a schematic representation of eye glance behaviour for fixation.
Figure 14:
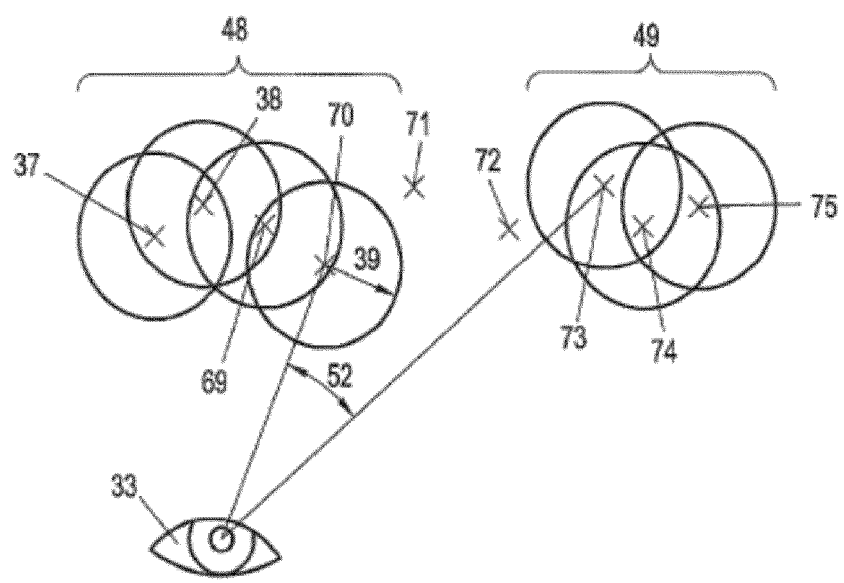
FIG. 14 illustrates a schematic representation of eye glance behaviour with a sequence for initial fixation, a saccade and a second fixation.

According to FIGS. 13 and 14, directly following example points of vision (37, 38) are at least tested and compared in a comparison device in relation to compliance with at least the first fixation criterion (25). The comparison device can be any suitable device. Preference is given to devices that include electronic logic modules or so-called logic gates, which allow a comparison of input data based on Boolean algorithms. Particular preference is given to devices that use this type of electronic logic modules in integrated form, particularly in the form of processors, microprocessors and/or programmable logic controllers. Particular preference is given to comparison devices that are implemented in a computer.

The comparison device processes so-called visual coordinates, which can be abbreviated in the following as VCO, and which can be determined based on a correlation function described above between a visual field image (79) and an eye image (78), wherein other methods or procedures can be used to determine these VCO.

The first fixation criterion (25) can be any type of criterion, which allows a differentiation between fixations and saccades. The preferred embodiment of the method according to the invention provides that the first fixation criterion (25) is a predefinable first distance (39) around the first point of vision (37), that the first relative distance (44) between the first point of vision (37) and the second point of vision (38) is determined, and that if the first relative distance (44) is less than the first distance (39), the first and second points of vision (37, 38) are assigned to the first fixation (48), therefore as long as a second point of vision (38) following a first point of vision (37) remains within the foveal area (34) of the first point of vision (37) and thus within the area of ordered perception of the first point of vision (37), ordered perception is not interrupted and thus continues to fulfil the first fixation criterion (25). This is therefore a first fixation (48). A particularly preferred embodiment of the method according to the invention provides that the first distance (39) is a first viewing angle (41), which preferably describes an area (34) assigned to foveal vision, in particular a radius between 0.5° and 1.5°, preferably approximately 1°, and that the distance between the first point of vision (37) and the second point of vision (38) is a first relative angle (42). Based on the visual coordinates determined using an eye tracking system, it is possible to determine saccades and fixations (48, 49) simply and accurately. FIG. 6 shows a first fixation (48), for example, which is formed from a sequence of four points of vision (37, 38, 69, 70). FIG. 13 also shows the first distance (39), the first viewing angle (41), the first relative distance (44) and the first relative angle (42). Around each of the four points of vision (37, 38, 69, 70) is a first circle (43) with the radius of the first distance (39), wherein it is clearly shown that the following point of vision (38, 69, 70) lies within the first circle (43) with radius first distance (39) of the preceding point of vision (37, 38, 69), and thus the preferred first fixation criteria (25) is met. In order to adapt to objects that are perceived differently or to different people and/or conditions, a further updated version of the invention provides that the first fixation criterion (25), particularly the first distance (39) and/or the first viewing angle (41), can be predefined. FIG. 14 shows a viewing sequence in which not all points of vision (37, 38, 69, 70, 71, 72, 73, 74, 75) satisfy the first fixation criterion (25). The first four points of vision (37, 38, 69, 70) satisfy the fixation criterion (25) and together form the first fixation (48), wherein the following three points of vision (71, 72, 73) do not satisfy the first fixation criterion (25). Only the fourth point of vision (74) following the first fixation (28) satisfies the first fixation criterion (25) compared to the third point of vision (73) following the first fixation (48). The third point of vision (73) following the first fixation (48) is therefore the first point of vision (73) of the second fixation (49), which is formed from a total of three points of vision (73, 74, 75). FIGS. 13 and 14 show illustrative examples, although fixations (48, 49) can occur in natural surroundings with a variety of individual points of vision. The area between the last point of vision (70) of the first fixation (48) and the first point of vision (73) of the second fixation (49) forms a saccade, therefore an area without perception. The angle between the last point of vision (70) of the first fixation (48) and the first point of vision (73) of the second fixation (49) is referred to as the first saccade angle (52).

The points of vision (37, 38) assigned to a saccade or a fixation (48, 49) can now be output for further evaluation, processing or representation. In particular, it can be provided that the first and the second point of vision (37, 38) can be output and marked as the first fixation (48) or the first saccade.

The following ones are further fixation and saccade definitions that may be used and implemented in the method to mark a fixation event according to the present invention:

Saccades are rapid movements of the eyes with velocities as high as 500° per second, while in fixations eyes remain relatively still during fixations for about 200-300 ms;

Fixations are eye movements that stabilize the retina over a stationary object of interest, while Saccades are rapid eye movements used in repositioning the fovea to a new location in the visual environment;

Using distinction between the periods in which an area of the visual scene is kept on the fovea—a fixation—and periods in which an area of the visual scene is brought onto the fovea—a rapid eye position change called a saccade;

Defining a saccade when the visual point direction of the eye tracking device wearer has moved more than a certain angle per time, (i.e. if it has more than a minimal angular velocity). The cutoff criterion in this case may be specified in units of angular velocity. Now turning back to the step n. 200, it is described that the zooming function is trigged by detection of at least a long fixation event, therefore among fixation events, shall be taken into account at least a long fixation event. In the present invention a preferred solution is defining the fixation event criterion occurring when eye movements of the eye tracking device wearer are stabilized over an object of interest (i.e. matches said object of interest) for a predetermined period of time, preferably in the range 0.5 to 5 sec. The long fixation event occurs when said period of time is a particularly long period of time, wherein a preferred solution said long period of time is in the range 2 to 5 sec, i.e. the duration of fixation is between 2 to 5 sec.

However regarding step 180 wherein is detected whether the long fixation visual point 22 matches the at least one object of interest 30 in the field of view of the user wearing the eye tracking device 1, the method may be implemented using known image object detection software. Furthermore regarding the condition defined in the step 180 it may be implemented that a boundary area around the object of interest 30 may be detected to implement and trigger steps 190a and 200 and possibly the following steps mentioned in this specification, as a safeguard alternative.

Furthermore the method may comprise the following steps dealing with the possibility wherein a second long fixation visual point 22 is detected but it is still over the already detected object of interest 30:

205: checking if a second long fixation visual point 22 is detected and matches the at least one object of interest 30 in the field of view of the user wearing the eye tracking device 1, 210: if the second long fixation visual point 22 is still over the object of interest 30, maintaining visualized the Region of Interest 40 on the display computer device 3.

Furthermore the method may comprise the following steps dealing with the possibility wherein a second long fixation visual point 22 is detected but it is NOT still over the already detected object of interest 30:

215: checking if a second long fixation visual point 22 is still comprised in the Region of Interest 40, 220: if the second long fixation visual point 22 is no more over the object of interest AND if the second long fixation visual point 22 is still comprised in the Region of Interest 40, repositioning the Region of Interest 40 in such a way that the second long fixation visual point 22 be the centroid of said repositioned Region of Interest 40 AND causing the display computer device 3 via internet live streaming to display the repositioned Region of Interest 40;

230: if the second long fixation visual point 22 is no more over the object of interest 30 AND if at least one fixation visual point 22 is out of the Region of Interest 40, zooming out to the visual representation 10 of a larger field of view compared to the Region of Interest 40, displaying in the display computer device 3 a predetermined low resolution image.

Furthermore the method may comprise the following steps dealing with the possibility wherein the user operating the display computer device 3 remotely connected, may also trigger manually the zooming in and out functions, specifying the centroid of the Region of Interest 40:

Receiving information from a user operating the display computer device 3, said information indicating a specific centroid of said Region of Interest 40 in the visual representations 10 of field of view of the user wearing the eye tracking device 1 causing the display computer device 3 via internet live streaming be able to zoom in said Region of Interest 40, in order to display on the display computer device 3 only the Region of Interest 40, thus providing a higher resolution image and/or Receiving information from a user operating the display computer device 3, which cause the display computer device 3 via internet live streaming zooming out to the visual representation 10 of a larger field of view compared to the Region of Interest 40, in order to display on the display computer device 3 the relevant visual representation 10. Furthermore the method may comprise the following steps dealing with the possibility wherein the user wearing the eye tracking device 1, may also trigger manually the zooming in and out functions, specifying the centroid of the Region of Interest 40:

Receiving information from a user wearing the eye tracking spectacles 1, said information indicating a specific centroid of said Region of Interest 40 in the visual representations 10 of field of view of the user wearing the eye tracking device 1 causing the display computer device 3 via internet live streaming be able to zoom in said Region of Interest 40, in order to display on the display computer device 3 only the Region of Interest 40, thus providing a higher resolution image and/or Receiving information from the eye tracking device 1 wearer, which cause the display computer device 3 via internet live streaming zooming out to the visual representation 10 of a larger field of view compared to the Region of Interest 40, in order to display on the display computer device 3 the relevant visual representation 10.

The present invention relates furthermore to an eye tracking device 1/a computer device 2 comprising a processor, a computer readable storage medium coupled to the processor said computer readable storage medium having stored thereon computer executable instructions which, when executed, configure the processor to perform the corresponding steps of the method already described in the present specification.

Object of the present invention is also the computer readable storage medium having stored thereon computer executable instructions which, when executed, configure the processor to perform the corresponding steps of the method already described in the present specification, according to all the embodiments described and disclosed in this specification.

The invention claimed is:

1. A method for zooming into a specific Region of Interest visualized in a display computer device, showing gaze inputs on a field of view from a user wearing an eye tracking device, comprising at least one eye camera configured to detect pupil position of the wearer the eye tracking device, thus providing gaze information of said user and one field of view camera configured to detect the field of view of said user, wherein the method comprises:
   receiving more than one visual representations of full field of view of the user wearing the eye tracking device;
   receiving gaze information representing movements of the user's gaze represented by visual points on related visual representations;
   having a predetermined fixation criterion, in order to determine fixation visual points of the user on one or more of the visual representations;
   receiving gaze information indicating fixation events on corresponding fixation visual points on related visual representations;
   having a predetermined long fixation criterion, in order to determine long fixation visual points;
   receiving gaze information indicating at least one first long fixation event on corresponding long fixation visual point on related visual representations-;
   causing a display computer device via internet live streaming to display at least fixation visual points and the at least one long fixation visual point on the visual representation of the field of view of the user, in a predetermined low resolution image;
   detecting possible object information indicating at least one object of interest respect to its background on related visual representations;
   checking if the long fixation visual point matches the at least one object of interest in the field of view of the user wearing the eye tracking device,
   if the long fixation visual point matches said object of interest, upon the long first fixation event occurring, defining a Region of Interest designed in such a way that the long fixation visual point is the centroid of said Region of Interest;
   causing the display computer device via internet live streaming, zooming in said Region of Interest and, in order to display on the display computer device only the Region of Interest, thus providing a higher resolution image to the display computer device.

2. The method according to claim 1, wherein the visual representation is a predetermined low resolution image and is a reduced visual representation concerning only the area of the field of view of the user wearing the eye tracking device where are detected the user's gaze movements.

3. The method according to claim 2 further comprising:
   checking if a second long fixation visual point is detected and matches the at least one object of interest in the field of view of the user wearing the eye tracking device if the second long fixation visual point is still over the object of interest-, maintaining visualized the Region of Interest on the display computer device.

4. The method according to claim 3 further comprising:
checking if a second long fixation visual point is still comprised in the Region of Interest,
if the second long fixation visual point is no more over the object of interest AND if the second long fixation visual point is still comprised in the Region of Interest, repositioning the Region of Interest in such a way that the second long fixation visual point be the centroid of said repositioned Region of Interest AND causing the display computer device via internet live streaming to display the repositioned Region of Interest;
if the second long fixation visual point is no more over the object of interest AND if at least one fixation visual point is out of the Region of Interest, zooming out to the visual representation of a larger field of view compared to the Region of Interest, displaying in the display computer device a predetermined low resolution image.

5. The method according to claim 4 wherein the long fixation criterion apply when duration of fixation is between 2 to 5 sec.

6. The method according to claim 1, further comprising causing the dimension of the Region of Interest be selectable by a user operating the display computer device via said display computer device.

7. The method according to claim 1, further comprising:
receiving information from a user operating the display computer device, said information indicating a specific centroid of said Region of Interest in the visual representations of field of view of the user wearing the eye tracking device
causing the display computer device via internet live streaming be able to zoom in said Region of Interest, in order to display on the display computer device only the Region of Interest, thus providing a higher resolution image
and/or
receiving information from a user operating the display computer device, which cause the display computer device via internet live streaming zooming out to the visual representation of a larger field of view compared to the Region of Interest, in order to display on the display computer device the relevant visual representation.

8. The method according to claim 7, further comprising causing the dimension of the Region of Interest be selectable by a user operating the display computer device via said display computer device, and wherein the dimension of the Region of Interest is set up automatically proportionally to the dimension of the object of interest corresponding to the long fixation visual point detected.

9. The method according to claim 1, wherein the speed of zooming in and zooming out events are set up automatically and proportionally to the duration of the long fixation event.

10. A non-transitory computer readable storage medium storing computer-executable instructions which, when executed, configure a processor to perform the method of claim 1.

11. A computer device comprising a processor, and a non-transitory computer readable storage medium coupled to the processor, the non-transitory computer readable storage medium having stored thereon computer executable instructions which, when executed by the processor, configure the processor to perform the steps of the method of claim 1.

12. A system comprising an eye tracking device comprising at least an eye camera to detect the pupil position of a user wearing said eye tracking device and further comprising a computer device configured connectable to the eye tracking device and configured to receive data from said eye tracking device, said computer device capable to implement the method of claim 1.

13. A method for zooming into a specific Region of Interest visualized in a display computer device showing gaze inputs on a field of view from a user wearing an eye tracking device comprising at least one eye camera configured to detect pupil position of the wearer the eye tracking device thus providing gaze information of said user and one field of view camera configured to detect the field of view of said user, wherein the method comprises:
sending more than one visual representations of full field of view of the user wearing the eye tracking device;
sending gaze information identifying movements of the user's gaze represented by visual points on related visual representations;
having a predetermined fixation criterion, in order to determine fixation visual points of the user on one or more of the visual representations-,
sending gaze information indicating fixation events on corresponding fixation visual points on related visual representations;
having a predetermined long fixation criterion, in order to determine long fixation visual points
sending gaze information indicating at least one first long fixation event on corresponding long fixation visual point on related visual representations-;
causing a display computer device via internet live streaming to display at least one fixation visual point and the at least one long fixation visual point on the visual representation of the field of view of the user, in a predetermined low resolution image;
detecting possible object information indicating at least one object of interest respect to its background on related visual representations;
checking if the long fixation visual point matches the at least one object of interest in the field of view of the user wearing the eye tracking device,
if the long fixation visual point matches said object of interest, upon the long first fixation event occurring, defining a Region of Interest designed in such a way that the long fixation visual point be the centroid of said Region of Interest;
causing the display computer device via internet live streaming zooming in said Region of Interest and, in order to display on the display computer device only the Region of Interest, thus providing a higher resolution image to the display computer device.

14. A non-transitory computer readable storage medium storing computer-executable instructions which, when executed, configure a processor to perform the method of claim 13.

15. An eye tracking device comprising a processor, a non-transitory computer readable storage medium coupled to the processor, the non-transitory computer readable storage medium having stored thereon computer executable instructions which, when executed by the processor, configure the processor to perform the steps of the method of claim 13.

* * * * *